United States Patent [19]

Nelson

[11] 4,394,575
[45] Jul. 19, 1983

[54] APPARATUS FOR MEASURING VAPOR DENSITY, GAS TEMPERATURE, AND SATURATION RATIO

[75] Inventor: Loren D. Nelson, Morrison, Colo.

[73] Assignee: Ophir Corporation, Denver, Colo.

[21] Appl. No.: 164,059

[22] Filed: Jun. 30, 1980

[51] Int. Cl.$^3$ ............................................. G01J 1/00
[52] U.S. Cl. ................................... 250/343; 250/345
[58] Field of Search .................. 250/343, 344, 345; 356/437, 438; 73/355 R

[56] References Cited

U.S. PATENT DOCUMENTS

| | | | |
|---|---|---|---|
| 3,121,790 | 2/1964 | Munday et al. | 250/343 |
| 3,718,429 | 2/1973 | Williamson, Jr. | 250/343 |
| 3,891,848 | 6/1975 | Fletcher et al. | 250/343 |
| 4,120,200 | 10/1978 | Braun | 73/355 R |
| 4,154,089 | 5/1979 | Carlon | 250/343 |
| 4,157,470 | 6/1979 | Kotaka et al. | 250/345 |

Primary Examiner—Janice A. Howell

[57] ABSTRACT

An apparatus for measuring vapor density and saturation ratio of individual chemical species in multi-component, multi-phase systems includes means to permit measurement in supersaturated vapor and in the presence of liquid, solid and dispersed aerosol phases of the sampled gas component and of other chemical species. Active narrowband differential measurements of broad band radiation passed through the sampled environment and then isolated to a plurality of narrow wavelength bands whose wavelength is related to the gaseous absorption spectra of the sampled species permit the measurement of vapor density of individual chemical components. A concurrent passive radiometric measurement of gas temperature in a strong absorption band of a relatively constant gaseous component enables the conversion of component vapor density to component saturation ratio even in the presence of component or system supersaturation.

6 Claims, 1 Drawing Figure

APPARATUS FOR MEASURING VAPOR DENSITY, GAS TEMPERATURE, AND SATURATION RATIO

BACKGROUND OF THE INVENTION

The present invention relates generally to gaseous absorption spectroscopy, to passive radiometric thermometry, to hygrometers, and more particularly to measurement of gaseous component vapor densities and saturation ratios in multicomponent, multiphase systems which may contain aerosols and may be supersaturated in the sampled component or other gases.

Measurement of gaseous component vapor density by means of radiation absorption at wavelengths selective to the sensed molecule is commonplace and has been practiced since the turn of the century. For example, U.S. Pat. No. 4,157,470 describes such a system and is typical of the art. Similarly, passive radiative gas thermometry by means of broadband Plankian emission is commonplace as typified by U.S. Pat. No. 4,120,200. Measurement of gaseous component vapor density at saturation ratios less that 1.00 is routinely accomplished by a variety of gravimetric, spectroscopic, chemical, condensation point, hygroscopic equilibrium, psychrometric, vapor adsorbtion, gaseous conductivity and other techniques.

Measurement of gas component vapor density and saturation ratio in supersaturated conditions where the saturation ratio can be in excess of 1.00 has not been routinely accomplished due to the extreme thermodynamic instability of such conditions. Recently Gerber in U.S. Pat. No. 4,083,249 has proposed a supersaturation hygrometer that operates by means of monodisperse submicron salt particles on a hydrophobic substrate in feedback equilibrium with an infrared heater. His device operates only in a very narrow supersaturation range, at temperatures warmer than the freezing point of water, and in the relative absence of hydrometeors. A literature search has disclosed no existing device which is capable of measuring arbitrary supersaturations with respect to either solid or liquid phases of the sensed molecule in multi-phase, multi-component systems which may contain dispersed aerosols or be at temperatures lower than the freezing point of the sensed molecule. Yet such supersaturations are very important to a variety of industries and scientific disciplines. To cite only a single example from the field of meteorology; atmospheric water supersaturations with respect to ice or liquid water are the dominant mid and high latitude precipitation forming mechanism, mediate most weather modification efforts, influence aircraft icing, dominate contrail formation and provide a means where heavy commercial airline traffic influences the earth's local climate and thermal radiation budget. A device capable of making such measurements would thus be of relevance to the field of meteorology.

SUMMARY OF THE INVENTION

The present invention, which provides a heretofore unavailable improvement in the measurement of gaseous component vapor density and saturation ratios in multi-phase, multi-component systems under harsh environmental conditions which may include vapor supersaturations and interfering particulates and bulk solid and liquid phases of the sensed and other chemical species; comprises a system where broad band radiation is passed through the gaseous sample volume and comparison of received narrowband radiation intensities at a plurality of wavelengths having different absorption coefficients to the sampled gas permits evaluation of the vapor density of the sampled gas in the sample volume. Since the measurement is made via optical means without physical contact, accurate vapor density measurements can be made in condensing or supersaturated conditions. Ratiometric comparisons of the received narrow band radiation intensities allow rejection of interference caused by particulate and bulk substances in the sample volume and also correct automatically for sensor response temporal drifts and beam misalignment. Substantially concurrent passive radiometric Plankian emission gas temperature measurements in an absorption band of a relatively constant concentration gaseous system component at a wavelength selected to provide a sample volume commensurate with the active broad band beam sample volume allow non-contact gas temperature measurement in condensing supersaturated conditions and thus allow the vapor density measurement to be converted to saturation ratio and supersaturation.

Accordingly, an object of the present invention is to provide a new and improved device to permit the measurement of vapor density under supersaturated conditions.

Another object of the present invention is to provide a new and improved device to permit measurement of component vapor density in multi-phase multi-component systems where interfering particulates and bulk substances may be present in the sample volume.

Yet another object of the present invention is to provide a new and improved device for measuring true gas temperature without physical contact under harsh conditions which may include condensing supersaturated vapor and interfering particulates and bulk substances which may be present in the sample volume.

Still another object of the present invention is to provide a new and improved device to permit measurement of saturation ratios which may be in excess of 1.00 in multi-phase and/or multi-component systems wherein interfering particulates and/or bulk substances may be present in the sample volume and supersaturated condensing conditions may be present; said measurements to be accomplished by synergistic combination of the aforementioned vapor density measuring and true gas temperature measuring devices.

Still another object of the present invention is to provide a new and improved device to make saturation ratio and vapor density measurements without hysteresis and with a response time on the order of tens of microseconds, as for example from a moving aircraft.

These and other objectives and features of the present invention will become apparent from the following description.

DETAILED DESCRIPTION OF THE PREFERRED EMBODIMENT

Figure 1:
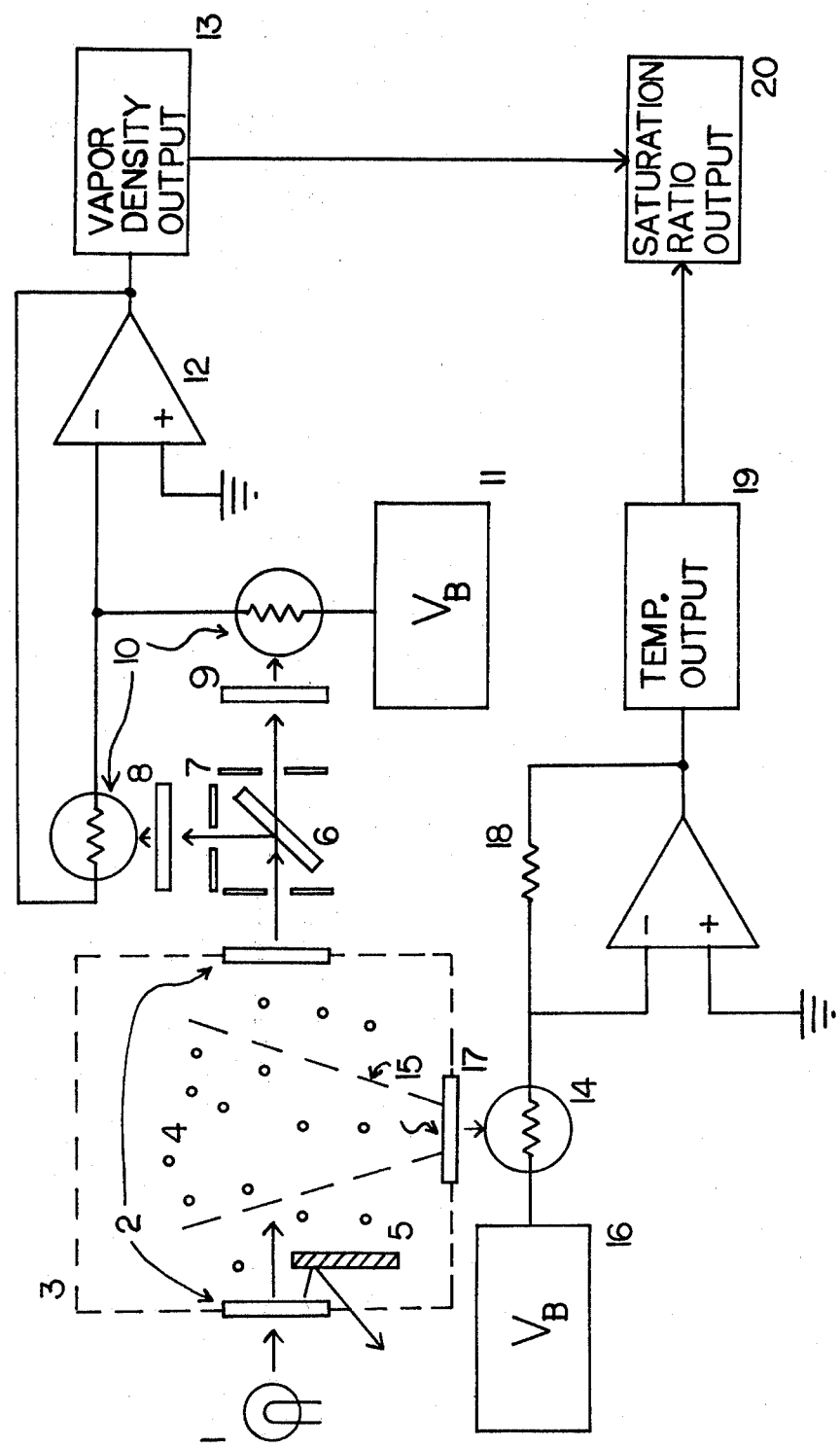
FIG. 1 is a schematic diagram of and illustrates the relationship between the elements of an embodiment of the invention.

FIG. 1 illustrates a device for measuring vapor density and saturation ratio in the presence of condensing supersaturated vapor and/or particulates and/or bulk substances which may be present in the sample volume.

In the illustrative specific embodiment to be set forth in this narrative description of FIG. 1, materials, wavelengths, light sources, and components described will be a representative set suitable for configuring the device to measure water vapor density and saturation ratio in cloudy, supersaturated conditions in the free atmosphere. It should be noted that this particular embodiment is illustrative only of the general principal of operation and that by proper selection of light sources, materials, dimensions, wavelengths, and components the basic device set forth in FIG. 1 is equally applicable to a number of other vapor density and saturation ratio sensing applications such as but not limited to methane in dusty mine environments, fuel vapors in tanks and engines, atmospheric gaseous pollutants such as nitrous oxide, contaminents in industrial process gas streams, and atmospheric levels of carbon dioxide. Consider then a specific embodiment set forth in FIG. 1 for the measurement of water vapor in air. A light beam from a broad band source such as a tungsten filament lamp 1 is transmitted through a heated transparent window system 2 into a sample volume 3 which contains the gaseous admixture of water vapor in air and possible particulate hydrometeors 4. Possible changes in the intensity of the incident beam due to source intensity drifts, beam misalignment, dirt on optics and solid bodies partially occultating the beam are represented schematically as a solid beam occultating body 5. After having passed through the sample volume 3, the broad band light beam is split into two parts by the beam splitter 6. Narrow bandpass filters 8 and 9 then isolate specific wavelength intervals which are absorbed to significantly different degrees by the gaseous absorber of interest. For water vapor a highly absorptive channel at substantially 2.665 micron wavelength and an essentially transparent channel at 2.450 micron wavelength will permit an instrument with a path length on the order of 20 centimeters. The received light intensity in these two narrow wavelength bands passed by the two bandpass filters 8 and 9 impinges on a matched pair of photoconductive lead sulfide detectors 10. By means of a bias voltage 11 applied to the photoconductor pair configured as load and feedback resistors of an operational amplifier 12, an output voltage 13 proportional to the ratio of the received intensities sensed by the photoconductors is generated. The beam attenuation at the two wavelengths due to water vapor is in each case determined by the Beer-Lambert absorption law as corrected for instrumental deviations and finite filter bandpasses. Since non-wavelength-dependent attenuating causes such as particulates in the beam, source intensity drifts, beam misalignment and partial occultation cause equal changes in the intensity sensed by the receiving photoconductors 10, these effects do not appear at the ratiometric output 13, which senses only wavelength dependent attenuation between the two narrow band received beam intensities. Since vapor, liquid, and gaseous absorption peaks of water vapor occur at different wavelengths, choice of these filter bandpasses to assure high differential water vapor absorption and low differential liquid water and ice absorption results in high order rejection of the liquid and solid phases. A system of baffles 7 assures that the detectors view only the direct collimated rays from the light source 1. It is to be noted with respect to the embodiment of FIG. 1 that other means for determining the received intensities could be used; for example photodiodes, phototransistors, thermistors, bolometers or photomultipliers. Similarly, the ratiometric output 13 can be generated in a number of ways other than via an operational amplifier feedback loop; such as for example, lock-in amplifier techniques or conventional load and bias resistors.

Further processing of the ratiometric output via logarithmic converters, power law expansions, conversion from transmittance to absorbance, system linearizing functions and the like can be achieved without changing the significant features of the subject invention. The output signal 13, however subsequently conditioned, is a direct measure of water vapor concentration in the sample volume regardless of hydrometeors or supersaturated conditions in the sample volume.

A substantially concurrent measurement of gas temperature is achieved by a passive radiometric sensor which, for example, in this embodiment can be achieved by a lead selenide photoconductor 14 having a field of view 15 and filtered by a narrow band 4.255 micron filter 17 whose wavelength has been selected to be in a strong absorption band of carbon dioxide, a relatively constant atmospheric constituent. Choice of intensity of carbon dioxide absorption by selection of the wavelength interval changes the effective sample volume to be commensurate with the active sample volume 3 of the vapor density sensor. Changes in pressure or carbon dioxide content of the atmosphere affect only the volumetric temperature spatial weighting function while true air temperature is given by the Plankian Emission Law at the selected filtered wavelength. Since temperature weighting of the sensor is inversely proportional to the sampled substance absorptivity at the sampled wavelength, other materials in the sample volume such as liquid water aerosols having small optical density at 4.255 microns contribute only negligibly to the temperature measurement.

A true measure of gas temperature independent of hydrometeor content thus results. Since the measurement of temperature is non-contact and the filter window 17 can be heated to prevent condensation, true gas temperature readings can be taken in particulate laden supersaturated condensing conditions. In this embodiment the signal from the lead selenide temperature sensing element 14 is conditioned by a bias voltage 16 and a feedback resistor 18 in the feedback loop of an operational amplifier to produce a signal proportional to the narrow band passive irradiance received on the sensor 14 and thus by the Plankian emission law, proportional to the air temperature. Other sensors capable of detecting infrared radiation such as, for example, bolometers or photoconductors or photovoltaic cells of other materials can be substituted for 14 without changing the substance of the instrument or method. Modulating photochoppers and lock-in phase and/or frequency sensitive amplifiers that can be used to increase signal to noise ratios have been omitted in FIG. 1 from both the vapor density and temperature signal conditioning circuitry for clarity and ease of exposition of the basic principles of the invention.

Having in this way achieved a substantially concurrent measure of vapor density from 13 and temperature from 19, a synergistic combination of these two quantities 20 results in a measurement of saturation ratio that remains valid in supersaturation conditions and in hydrometeor laden atmospheres. Calculation of saturation ratio from vapor density and temperature is well known and can be accomplished by tabular means such as for example, the Smithsonian Meterological Tables or by analytical or empirical formulas such as for example, the Goff-Gratch Formulation. The saturation ratio calculation can either be accomplished in a post-processing mode by manual or computer aided calculation or in quasi-real time by analog or digital processing techniques.

While a preferred embodiment of the instant invention for a particular application has been shown and described in detail, it will be apparent to those skilled in the art that other vapor density and saturation ratio sensing applications abound and that various modifications, alterations and functional equivalents thereof can be made without detracting from the principle and spirit of the method and invention. Accordingly, the method and invention is to be limited only by the following claims.

The invention claimed is:

1. A new and improved passive radiometric device for measuring true air temperature without physical contact wherein the improvement comprises:
   an extremely narrow system wavelength received radiance bandpass on the order of 0.5 microns or less, said received radiance bandpass being selected to be in the strong carbon dioxide absorption band whose center is at substantially 4.255 microns.

2. A device to measure the saturation ratio of gaseous components in systems which contain multiple chemical components, comprising:
   an apparatus for measuring gaseous component vapor density by means of radiation absorption at a wavelength band relatively strongly absorbed by said gaseous component and wherein said wavelength band is selected to be relatively unaffected by said other chemical components;
   an apparatus for measuring gas temperature by means of passive radiometric measurements of received radiance at a narrow bandpass on the order of 0.5 microns or less, said narrow bandpass of system sensed radiance being selected to be in a relatively intense absorption band of a component of the gas whose temperature is sensed and also being selected to be in a spectral region of relatively low absorbance by said interfering chemical components, and where said narrow bandpass of system sensed radiance is selected to provide a temperature sensing sample volume substantially spatially and temporally commensurate with the aforementioned means for measuring gaseous component vapor density;
   means for synergestically combining the aforementioned substantially spatially and temporally commensurate measurements of individual gaseous component vapor density and gas temperature, wherein:
   the above measurement of gas temperature is used to determine the saturation vapor density of the said sensed gaseous component by reference to known values of the saturation vapor density of said sensed gaseous component as a function of temperature, and
   saturation ratio then being determined as the ratio of the aforementioned gaseous component vapor density measurement to the aforementioned saturation vapor density of the same gaseous component.

3. A device to permit measurement of saturation ratio as set forth in claim 2 above and wherein:
   the sampled gaseous component is water vapor and at least one of the aforementioned vapor density sensing wavelengths is in the strong water vapor absorption band centered at substantially 2.665 microns.

4. A device to permit measurement of saturation ratio as set forth in claim 2 above and wherein:
   the sampled gaseous component is water vapor in air and the aforementioned gas temperature measurement is by means of the aforementioned received radiance bandpass being selected to be in the strong carbon dioxide absorption band whose center is at substantially 4.255 microns.

5. A device to measure saturation ratios of gaseous components as set forth in claim 2 above and wherein:
   the measured system is supersaturated with respect to the sensed gaseous component.

6. A device to measure saturation ratios of gaseous components as set forth in claim 2 above and wherein:
   the measured system contains dispersed aerosols of the condensed phase of the sensed gaseous component.

* * * * *